United States Patent [19]
Freyer et al.

[11] Patent Number: 5,235,453
[45] Date of Patent: Aug. 10, 1993

[54] HOLDING UNIT FOR A MEASURING DEVICE

[75] Inventors: Norbert Freyer, Sandhausen; Helmut Kipphan, Schwetzingen; Gerhard Löffler, Walldorf; Harald Bucher, Eschelbronn, all of Fed. Rep. of Germany

[73] Assignee: Heidelberger Druckmaschinen AG, Heidelberg, Fed. Rep. of Germany

[21] Appl. No.: 665,780

[22] Filed: Mar. 7, 1991

[30] Foreign Application Priority Data

Mar. 7, 1990 [DE] Fed. Rep. of Germany ....... 9002649

[51] Int. Cl.⁵ .......................................... H04B 10/00
[52] U.S. Cl. ................................ 359/144; 359/142; 356/445
[58] Field of Search ................ 359/142, 143, 144; 356/446, 445; 250/338.1; 235/472, 380

[56] References Cited

U.S. PATENT DOCUMENTS

| | | | |
|---|---|---|---|
| 4,850,009 | 7/1989 | Zook et al. | 235/375 |
| 4,961,646 | 10/1990 | Schrämmli et al. | 356/448 |
| 4,963,029 | 10/1990 | Kipphan | 356/401 |
| 4,968,140 | 1/1991 | Berner et al. | 356/328 |
| 5,055,660 | 10/1991 | Bertagna et al. | 235/472 |
| 5,079,412 | 1/1992 | Sugiyama | 235/472 |

OTHER PUBLICATIONS

The Gretag SPM 100 Spectrophotometer is the optimum complement for Gretag's spectrum of world-renowned densitometers, Gretag, Dec. 1989.

*Primary Examiner*—Edward L. Coles, Sr.
*Assistant Examiner*—Raphael Bacares
*Attorney, Agent, or Firm*—Herbert L. Lerner; Laurence A. Greenberg

[57] ABSTRACT

A holding unit for a measuring device having a base carrying an inductive charging input, and a side wall formed with openings for infrared data transmission, includes a two-step cover surface including an upper cover surface and a lower cover surface, the lower cover surface being formed with a recess having a contour corresponding to the contour of the measuring device for receiving the measuring device therein, a side wall of the holding unit partly defining the recess formed in the lower cover surface and being formed with openings for infrared data transmission coinciding with the openings for infrared data transmission formed in the side wall of the measuring device when the measuring device is received in the recess, an output for an inductive power supply disposed in a base of the recess formed in the lower cover surface, the output coinciding with the inductive charging input carried by the measuring device when the measuring device is received in the recess, the upper cover surface being formed with two substantially rectangular recesses, one of the substantially rectangular recesses having a contour corresponding to the outer contour of a printer receivable therein.

2 Claims, 3 Drawing Sheets

HOLDING UNIT FOR A MEASURING DEVICE

The invention relates to a holding unit for a measuring device, such as is disclosed in U.S. Pat. No. 4,963,029, for example, and has a base carrying an inductive charging input, and a side wall formed with openings for infrared data transmission.

U.S. Pat. No. 4,965,029 discloses a register mark reader or, more specifically, a register cross reader for checking accuracy of register in multicolor printing. The energy supply for such a register cross reader can be provided inductively via an inductive input located in the bottom or base of the register cross reader. Data transmission from the register cross reader for external data processing can be effected by infrared data transmission. In this regard, openings can be provided in the register cross-reader housing for infrared transmission.

It is accordingly an object of the invention to provide a holding unit for such a measuring device with an inductive charging input in the base or bottom of the measuring device and openings for infrared data transmission formed in a side wall of the measuring device so that, by simply depositing the measuring device in the holding unit, couplings or connections for data transmission and inductive loading are simultaneously established and maintained and, by removing the measuring device from the holding unit, the connections can again be interrupted, and first printouts of the measuring result can be taken directly from the holding unit of a printer and can be deposited in the proximity of the printer.

With the foregoing and other objects in view, there is provided, in accordance with the invention, a holding unit for a measuring device having a base carrying an inductive charging input, and a side wall formed with openings for infrared data transmission, the holding unit comprising a two-step cover surface including an upper cover surface and a lower cover surface, the lower cover surface being formed with a first recess or depression a contour corresponding to the contour of the measuring device for receiving the measuring device therein, a side wall of the holding unit partly defining the first recess and being formed with openings for infrared data transmission which are aligned with the openings for infrared data transmission formed in the side wall of the measuring device when the measuring device is received in the first recess, an output for an inductive power supply disposed in a base of the first recess, the output coinciding with the inductive charging input carried by the measuring device when the measuring device is received in the recess, the upper cover surface being formed with a second and a third recess or depression, respectively, formed with substantially rectangular outlines, one of the second and the third recesses having a contour corresponding to the outer contour of a printer receivable therein.

When the measuring device is deposited in the recess having the contour corresponding to the outer contour of the measuring device, couplings or connections for the infrared data transmission and the inductive power supply between the measuring device and the holding unit are established immediately. The printer which is connected in a conventional manner is able to print the first data directly after the measuring device has been deposited in the holding unit. For this purpose, the operator or pressman no longer has to refer to a central evaluation unit between individual measurements. He can deposit the printed measuring results obtained in a series of measurements in the second substantially rectangular recess, which reduces the risk of losing and not locating the printouts and, consequently, also the need for a costly search therefor is considerably reduced. During and between measurements, a holder for the measuring device, the printer and additional filing space provided by the second recess are thus positioned in the field of vision of the pressman or operator in a relatively simple and well-organized manner.

In accordance with another feature of the invention, the first recess is defined by an inclined surface on one side thereof, and of the first recess located opposite is open on another side thereof the outside thereof.

Due to this construction, the user can easily insert the measuring device into the recess formed in the lower cover surface from the open side thereof until the measuring device abuts the closed side of that recess; moreover, the user or pressman has a better view of the possible displays on the measuring device.

If necessary or desirable, the centrally integrated holding unit may also prove useful to the user or pressman for depositing other objects therein under clear observation.

Other features which are considered as characteristic for the invention are set forth in the appended claims.

Although the invention is illustrated and described herein as embodied in a holding unit for a measuring device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing, in which.

Figure 1:
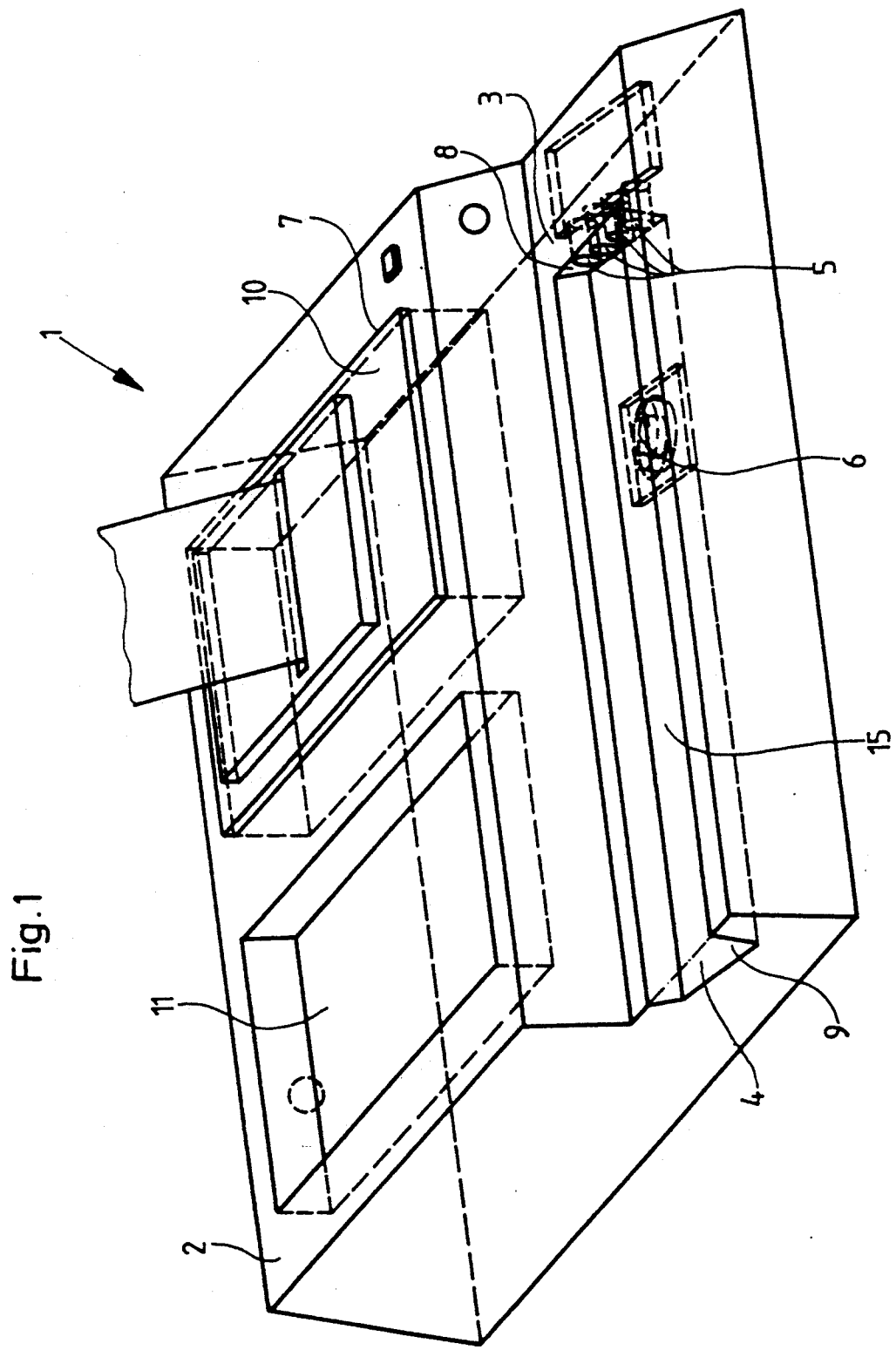
FIG. 1 is a top, front and side perspective view of a holding unit constructed in accordance with the invention.
Figure 2:
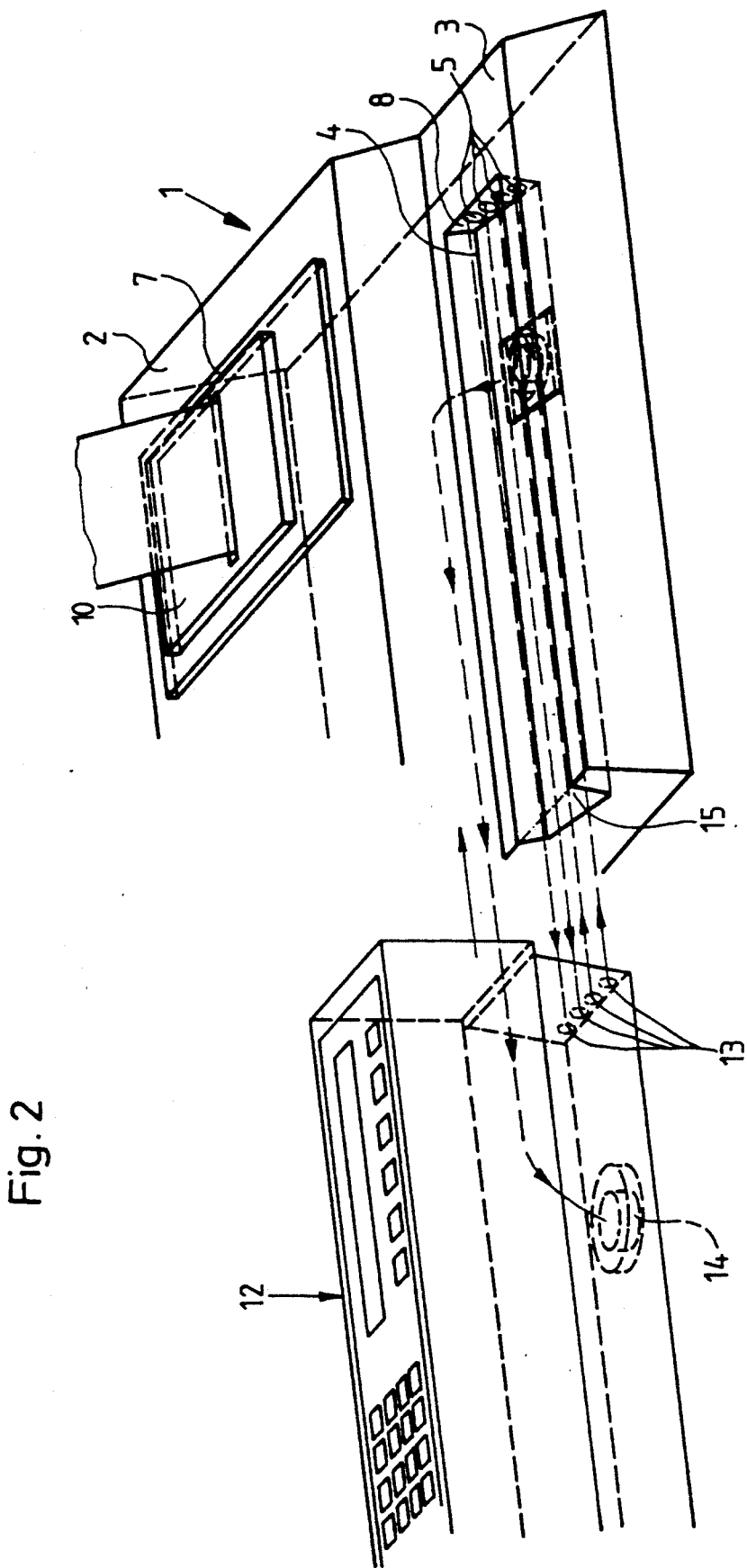
FIG. 2 is a fragmentary view, reduced in size, of FIG. 1 together with a fragmentary view of a measuring device installable therein.

Referring now to the drawing and, first, particularly to FIG. 1 thereof, there is shown therein a holding unit 1 having an upper cover surface 2 and a lower cover surface 3, the latter having an inclined rectangular recess 4 formed therein. A side wall 8 partly defining the rectangular recess 4 is formed with openings 5 for infrared data transmission. Opposite to the side wall 8, the recess 4 formed in the holding unit 1 is left open. The recess 4 is also partly defined by a bottom surface 15 in which an inductive charging output or outlet 6 is disposed. As shown in FIG. 2, a measuring device 12 is insertable by being slid in direction of the arrow form-fittingly into the recess 4 towards the infrared data transmission openings 5. In the inserted position of the measuring device 12 wherein it abuts the side wall 8, openings 13 for infrared data transmission which are provided in the measuring device 12, are coupled with the aligned or coinciding openings 5 formed in the side wall 8, and an input 14 for an inductive power supply provided at the bottom of the measuring device 12 is coupled to the output 6.

As shown in FIG. 1, two rectangular recesses 7 and 11 are formed in the upper cover surface 3. A printer 10 fits precisely into the recess 7.

Figure 3:
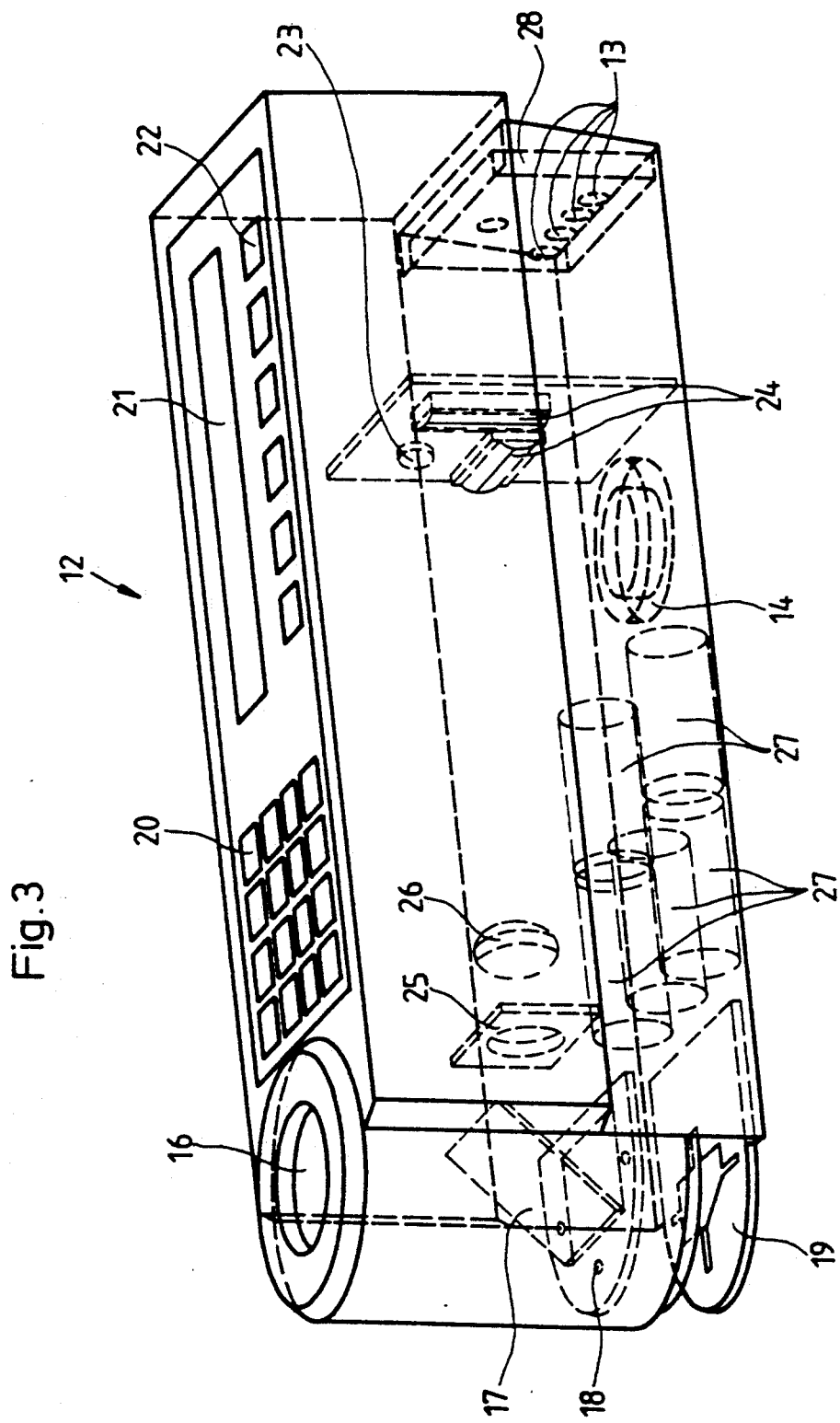
FIG. 3 is a top, front and side perspective view of the measuring device.

In FIG. 3, there is illustrated a measuring device 12, for example, a register mark reader of the type generally known from the aforementioned U.S. Pat. No. 4,963,029, but which deviates somewhat therefrom in the outer shape thereof, and in the construction or design of the keyboard 20 and 22, as well as the display 21. As is readily apparent, the measuring device 12 of FIG. 3 is provided with an inductive input 14 for supplying energy which is constructed as an induction charging coil. Several accumulators 27 for storing energy are also provided in the measuring device 12 and are electrically coupled with the induction charging coil 14. With the aid of an infrared—data transmission unit 28, data is transmissible i.e. externally picked up or fed in from the outside, through the openings 13. The register mark reader 12, as described in U.S. Pat. No. 4,963,029 noted above, is alignable or adjustable on paper sheets to be measured or checked and is provided with a magnifying lens or eyepiece 16, a mirror 17, and a sight 19 disposed along a common optical axis. An illuminating source 18 illuminates the sight 19. The mirror 17 is also disposed on another optical axis with a filter 25 and an optical system 26 to a light receptive assembly made up of a diode 23 and diode lines 24 disposed at right angles to one another. The manner of operation of the register mark reader 12 and the internal construction thereof are clearly apparent from the aforementioned U.S. Pat. No. 4,963,029, a choice of functions being offered by suitably depressing keys on keyboards 20 and 22. Measurement results are directly readable from a display 21.

Equipping the holding unit 1 with sensors for acquiring and transmitting infrared data through the openings 5 is conventional and is therefore not further described herein. Likewise, the non-illustrated sensors as well as the inductive charging output 6 and the printer 10 are connected and linked to one another in a conventional manner.

We claim:

1. Holding unit for a measuring device having a base carrying an inductive charging input, and a side wall formed with openings for infrared data transmission, the holding unit comprising a two-step cover surface including an upper cover surface and a lower cover surface, said lower cover surface being formed with a first recess having a contour corresponding to the contour of the measuring device for receiving the measuring device therein, a side wall of the holding unit partly defining said first recess and being formed with openings for infrared data transmission which are aligned with the openings for infrared data transmission formed in the side wall of the measuring device when the measuring device is received in said first recess, an output for an inductive power supply disposed in a base of said first recess, said output being aligned and connected with the inductive charging input carried by the measuring device when the measuring device is received in said recess, said upper cover surface being formed with a second and a third recess, respectively, formed with substantially rectangular outlines, one of said second and third recesses having a contour corresponding to the outer contour of a printer receivable therein.

2. Holding unit according to claim 1, wherein said first recess is defined by an inclined surface on one side thereof, and said first recess is open on another side thereof located opposite the side wall formed with openings for infrared data transmission.

* * * * *